United States Patent [19]

Okumura et al.

[11] Patent Number: 4,953,952
[45] Date of Patent: Sep. 4, 1990

[54] COLOR LIQUID CRYSTAL DISPLAYING PANELS

[75] Inventors: Takuzo Okumura, Tokyo; Toyokazu Okada; Hitoshi Kikui, both of Osaka; Kazuo Nakata, Tokyo, all of Japan

[73] Assignee: Sumitomo Chemical Company, Ltd., Osaka, Japan

[21] Appl. No.: 218,487

[22] Filed: Jul. 7, 1988

Related U.S. Application Data

[62] Division of Ser. No. 858,727, May 2, 1986, abandoned.

[30] Foreign Application Priority Data

May 2, 1985 [JP] Japan ................... 95103/85

[51] Int. Cl.$^5$ .............................. G02F 1/133
[52] U.S. Cl. ................... 350/337; 350/339 F; 350/339 R
[58] Field of Search ...... 350/337, 339 F, 338, 350/334, 311, 398, 408

[56] References Cited

U.S. PATENT DOCUMENTS

| | | | |
|---|---|---|---|
| 3,539,657 | 11/1970 | Noshay et al. | 525/906 X |
| 3,629,170 | 12/1971 | Yamanouchi et al. | 525/906 X |
| 3,881,809 | 5/1975 | Fergason et al. | 350/358 |
| 4,196,973 | 4/1980 | Hochstrate | 350/345 |
| 4,228,574 | 5/1979 | Culley et al. | 350/337 X |
| 4,387,133 | 6/1983 | Ichikawa et al. | 350/337 |
| 4,408,836 | 10/1983 | Kikuno | 350/334 |
| 4,560,241 | 12/1985 | Stolov et al. | 350/339 F |
| 4,600,274 | 7/1986 | Morozumi | 350/337 |

FOREIGN PATENT DOCUMENTS 3127347 7/1982 Fed. Rep. of Germany .
0017135 2/1980 Japan ................... 350/337
0070816 5/1980 Japan ................... 350/337
0060730 4/1983 Japan ................... 350/337
0125002 7/1983 Japan ................... 350/337
59-180525 10/1984 Japan .
5760106 10/1984 Japan .

OTHER PUBLICATIONS

Jenkins et al., *Fundamentals of Optics* pp. 543-546, McGraw-Hill, 1950.
1985 SID International Symposium, Session VI "LCD Technology", Orlando, Apr. 30, 1985 & Digest of Technical Papers, May, 1985, pp. 67, 71-73.
Patent Abstracts of Japan, vol. 7, No. 73 (P-186) (1218), Mar. 25, 1983.
Patent Abstracts of Japan, vol. 8, No. 245 (P-312) (1682), Nov. 10, 1984.

*Primary Examiner*—Stanley D. Miller
*Assistant Examiner*—Anita P. Gross
*Attorney, Agent, or Firm*—Cushman, Darby & Cushman

[57] ABSTRACT

A color liquid crystal display panel with improvements in brightness of display, viewing angle and workability which comprises a liquid crystal layer which is provided with two light-polarizing plates on opposite side as substrates. One of the light-polarizing plates is made, in the following order, from the light-polarizing layer, a color filter layer formed on the outside surface of a protective film layer, the protective film layer of nonrotary polarization polymer and a transparent conductive film layer formed on the inside surface of the protective film layer. The other light-polarizing plate is made in the following order, from the light-polarizing layer and a transparent conductive film layer.

6 Claims, 2 Drawing Sheets

COLOR LIQUID CRYSTAL DISPLAYING PANELS

This is a continuation of application Ser. No. 06/858,727, filed May 2, 1986, which was abandoned upon the filing hereof.

BACKGROUND OF THE INVENTION

This invention relates to a structure of a color liquid crystal display panel. More particularly, it relates to a color liquid crystal display panel wherein a light-polarizing plate in which a color filter is integrated is used as a substrate. Color liquid crystal display panels are widely used for color displays such as watches, electric calculators, televisions, measuring instruments, automotive instruments, etc. and furthermore, they may be used for optical applications such as graphic displays, optical shutters, etc.

The conventional color liquid crystal display panels are shown, for example, in FIG. 4 (Unexamined Japanese Patent Application Publication No. 180525/84), wherein polarizers 411 and 412, protective films 421–424 for the polarizers, glass substrates 431 and 432, a color filter 440, transparent electrodes (transparent conductive coating) 451 and 452, a sealing material 460 and a twisted nematic liquid crystal layer 470 are indicated.

However, these color liquid crystal display panels have the following problems:

(1) The display quality is not stable over a long period of time, since the color filter is brought into contact with the liquid crystal layer through a very thin aligning film (not shown in FIG. 4), the diffusion of ions, molecules, etc. into the liquid crystal and discoloration of the color filter, results.

(2) The thickness of the color liquid crystal display cells can not be made smaller, since the substrate is made of glass. There is also a limit in making the display brighter due to absorption of light by the glass substrate. Further, the display is not clearly visible for a viewer unless he is directly facing the screen, since the light polarizing plate and color filter are separated by the glass substrate. Thus, such display panels have a narrow viewing angle.

(3) A rise time is required because the transparent electrode contacts with the liquid crystal layer through the color filter.

(4) There is a problem in adherence between the color filter and the transparent electrode and the yield is low.

(5) Workability is low because an additional step of bonding the light-polarizing plate and the glass substrate is required.

Another color liquid crystal display panel is proposed as in FIG. 5 of Unexamined Japanese Patent Application Publication No. 180525/84 in order to solve some of the above problems. In FIG. 5, there are indicated polarizers 511 and 512, protective films 521–524 for the polarizers, glass substrates 531 and 532, a color filter 540, transparent electrodes 551–552, a sealing material 560, a twisted nematic liquid crystal layer 570 and an intermediate thin glass substrate 580. In this display panel, the color filter is separated from the liquid crystal layer by placing the color filter on one side of the intermediate thin glass substrate opposite the liquid crystal layer and the transparent electrode on the same side as the liquid crystal layer. In this panel, the above stated problems (1), (3) and (4) are improved to some extent, but no improvement is seen for problems (2) and (5). There is a limit to the thickness of the intermediate thin glass substrate 580 and there is also a limit to the thickness of liquid crystal cell due to the presence of glass substrates 531 and 532. Furthermore, it requires additional steps such as bonding to the glass substrates, etc.

Another multi-color light-polarizing plate is proposed where a color filter is provided on a protective film for the light-polarizing plate in FIG. 6 of Unexamined Japanese Utility Model Application Publication No. 60106/82. In FIG. 6, there are shown a polarizer 610, protective films 621 and 622 for the polarizer 610 and a color filter layer 640. When a liquid crystal cell is made by bonding this multi-color light-polarizing plate to a glass substrate, the color filter can be separated from the color liquid crystal layer. Although there are improvements similar to those shown in Unexamined Japanese Application Publication No. 180525/84, they are not satisfactory yet. Furthermore, the viewing angle is smaller, since the transparent electrode and the color filter are faced through the glass substrate. On the other hand, when this light-polarizing plate is used as a substrate for a color liquid crystal display cell, the thickness of the liquid crystal cell can be made smaller and hence improvements may be made in making the display brighter, widening the viewing angled and increasing the workability. However, there are still the following problems, the color filter layer and the transparent electrode must be formed in contact with each other, and ions, molecules, etc. in dyes migrate into the transparent electrode to cause deterioration in performance; since a transparent conductive coating (electrode) is formed on the color filter layer by evaporation, a problem arises in adherence and the yield is reduced.

The inventors have done intensive research to solve these problems.

SUMMARY OF THE INVENTION

The invention provides for an improved color liquid crystal display panel in which two light-polarising plates are provided, as panel substrates, on opposite sides of a liquid crystal layer. One of the light-polarizing plates is made, in the following order, from the light-polarizing layer, a color filter layer formed on the outside surface of a protective film layer, the protective film layer of non-rotatory polarization polymer and a transparent conductive film layer formed on the inside surface of the protective film layer. The other light-polarizing plate is made, in the following order, from the light-polarizing layer and a transparent conductive film layer. The other light-polarizing plate is preferably made in the following order, from the light-polarizing layer, a protective film layer of non-rotatory polarizing polymer and a transparent conductive film layer formed on the inside surface of the protective layer. The two transparent conductive film layers are brought into contact with the opposite sides of the liquid crystal layer. Protective films mentioned above may further be provided on the outer surfaces of the present color liquid crystal display.

The above five problems encountered in the conventional display panels are all removed in the color liquid crystal display panel of this invention. Especially, the display becomes brighter, the viewing angle is widened and workability is improved by reduction of fabricating steps.

DETAILED DESCRIPTION OF THE INVENTION

One of preferred embodiments of this invention will be explained in referance to the drawings.

Figure 1:
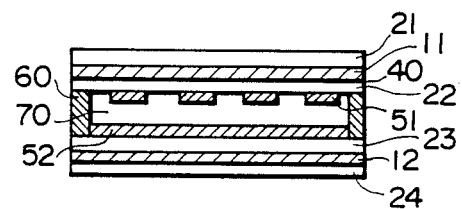
FIG. 1 is a cross-sectional view of one of color liquid crystal display panels according to the invention.
Figure 2:
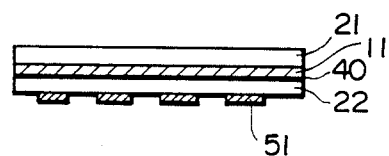
FIG. 2 is a cross-sectional view of one of the light-polarizing plates having a color filter and a transparent electrode according to the invention.
Figure 3:
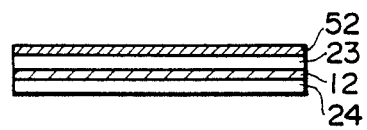
FIG. 3 is a cross-sectional view of one of the other light-polarizing plates having a transparent electrode according to the invention.

In FIGS. 1, 2 and 3, there are shown polarizers 11 and 12, protective films 21-24 of non-rotatory polarization polymer film, a color filter layer 40 formed on said protective film, transparent electrodes 51 and 52, a sealing material 60 and a liquid crystal layer 70.

The polarizers 11 and 12 are made of iodine or a dichromic dye adsorbed with orientation to polyvinyl alcohol, derivatives thereof, polyenes produced by heating polyvinyl alcohol containing a catalyst for dehydration, etc. As the protective films 21-24, there have been used cellulosic polymer films such as cellulose triacetate in the conventional light-polarizing plates. In the present invention, besides the cellulosic polymer films, uniaxially stretched non-rotatory polarization thermal-resistant polymer films such as polyethersulfone, polysulfone, etc., fluorine films such as tetrafluroethylenehexafluoropropylene copolymer, etc., polyolefin films such as polypropylene, etc., and polyamide films such as nylon 12, nylon 66, etc., and polyester films such as polyethylene terephthalate may be used, etc.

The protective films 21-24 should be made of thermally and mechanically stronger polymer films, in order to form the color filter and the transparent conductive film or electrode thereon. Particularly, polyethersulfones having the following structural formula are preferred, because the color filter layer and the transparent electrode layers can be easily formed thereon, birefringence at film formation is small and light transmission is good and furthermore, they have suitable thermal resistance and mechanical strength.

The non-rotary polarization polymer used as a protective film is a polyethersulfone represented by the following structural formula:

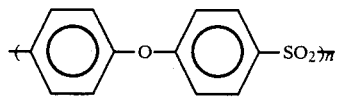

The color filter layer 40 is usually formed, on the protective film by printing, photolithography, etc. with pigments, dyes, etc. of three primary colors.

The transparent electrodes 51 and 52 are made of a thin film of stannic oxide, indium oxide or an appropriate mixture thereof, metals such as gold, palladium, rhodium, etc. and is usually formed by sputtering, vacuum evaporation, etc. As sealing material 60, suitable organic or inorganic sealing materials are used and epoxide resins are ordinarily used as organic sealing materials. The liquid crystal 70 is, for example, a twist nematic one which is twist-oriented by rubbing or oblique evaporation of $SiO_2$, etc. after the substrate and the transparent conductive film are treated with a suitable orientation agent. The liquid crystal may be a guest-host one.

The present color liquid crystal display panel illustrated in FIGS. 1-3 may be modified as follows. The transmission type panel as shown in FIG. 1 is changed to a reflection-type by adhering a reflection film such as aluminum on and under the protective film 24 with an adhesive agent. The protective film 24 and/or 21 may be omitted. The protection film 23 may be omitted and a transparent electrode 52 is provided directly on the surface of the light-polarizer 12 or to place a glass plate on the surface of protective film 21 or 24.

The color liquid crystal display panel according to the present invention can be used for color displays using liquid crystal such as watches, electric calculators, televisions, measuring instruments, automotive instruments, etc. and for optical applications such as graphic displays, and optical shutters.

Figure 4:
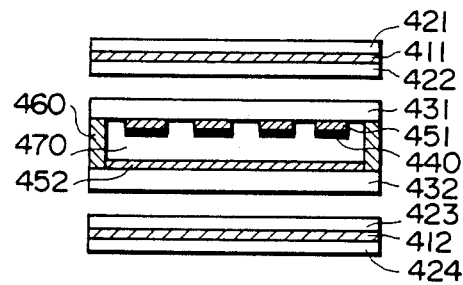
FIG. 4 is a cross-sectional view of the conventional color liquid crystal display panel illustrated in Unexamined Japanese Patent Application Publication No. 180525/84.
Figure 5:
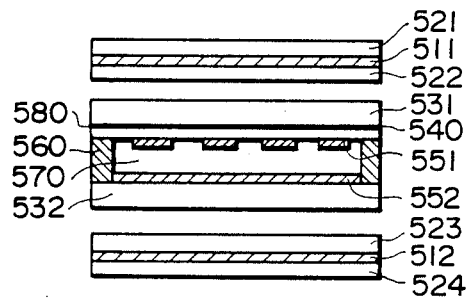
FIG. 5 is a cross-sectional view of a color liquid crystal display according to Unexamined Japanese Patent Application Publication No. 180525/84.
Figure 6:
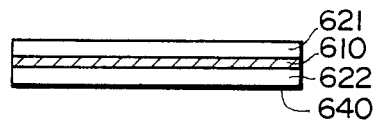
FIG. 6 is a cross-sectional view of a multi-color light-polarizing plate having a color filter according to Unexamined Japanese Utility Model Application Publication No. 60106/82.

The color liquid crystal display panel of the present invention is above to be thinner by 0.5-2.0 mm than the conventional color liquid crystal display panels as in FIGS. 4 and 5 and is considerably brighter in its display and improved in viewing angle.

In addition, the subsequent step of bonding the panel to a glass plate with adhesives can be omitted, the fabricating steps can be reduced and thus workability is highly improved.

We claim:

1. A color liquid crystal display panel comprising:
a liquid crystal layer; and
a first light-polarizing plate arranged on a first side of said liquid crystal layer, said first light-polarizing plate including layers in the following order: a first exterior protective film layer of non-rotary polarization polymer, a first light-polarizing layer, a first color filter layer of three primary colors formed with pigments or dyes and having no polarizing layer, a second protective film layer comprising a non-rotatory polarization polymer having an outside surface upon which an inner surface of said first color filter layer is formed, and a first transparent conductive layer formed on the inside surface of said second protective film layer and being in contact with said liquid crystal layer; and
a second light-polarizing plate arranged on a second side of said liquid crystal layer opposite to said first side, said second light-polarizing plate including layers in the following order: a third exterior protective film layer of non-rotatory polarization polymer, a second light-polarizing layer, a fourth protective film layer of non-rotatory polarization polymer and a second transparent conductive layer formed on an inside surface of said fourth protective film layer and being in contact with said liquid crystal layer.

2. A color liquid crystal display panel according to claim 1 wherein the non-rotatory polarization polymer used as a protective film is a polyethersulfone represented by the following structural formula:

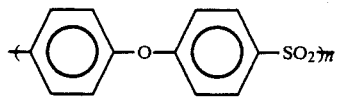

3. A color liquid crystal display panel according to claim 1 wherein the liquid crystal layer is a twisted nematic liquid crystal.

4. A color liquid crystal display panel according to claim 1 further comprising a reflection film applied to said second light-polarizing plate.

5. A color liquid crystal display panel according to claim 1 further comprising a glass plate applied on at least one surface of the two outside protective film layers.

6. A light-polarizing plate comprising layers in the following order:
a first exterior protective film layer of non-rotatory polarization polymer, a first light-polarizing layer, a color filter layer of three primary colors formed with pigments or dyes, a second protective film layer comprising a non-rotatory polarization polymer having an outside surface upon which an inside surface of said color filter layer is formed, and a transparent conductive layer formed on the inside surface of said second protective film layer.

* * * * *